March 8, 1927.  W. M. DENSMORE  1,620,445

CAM DEVICE

Filed May 19, 1926  2 Sheets-Sheet 1

W. M. Densmore
INVENTOR
BY Victor J. Evans
ATTORNEY

March 8, 1927.   W. M. DENSMORE   1,620,445
CAM DEVICE
Filed May 19, 1926   2 Sheets-Sheet 2
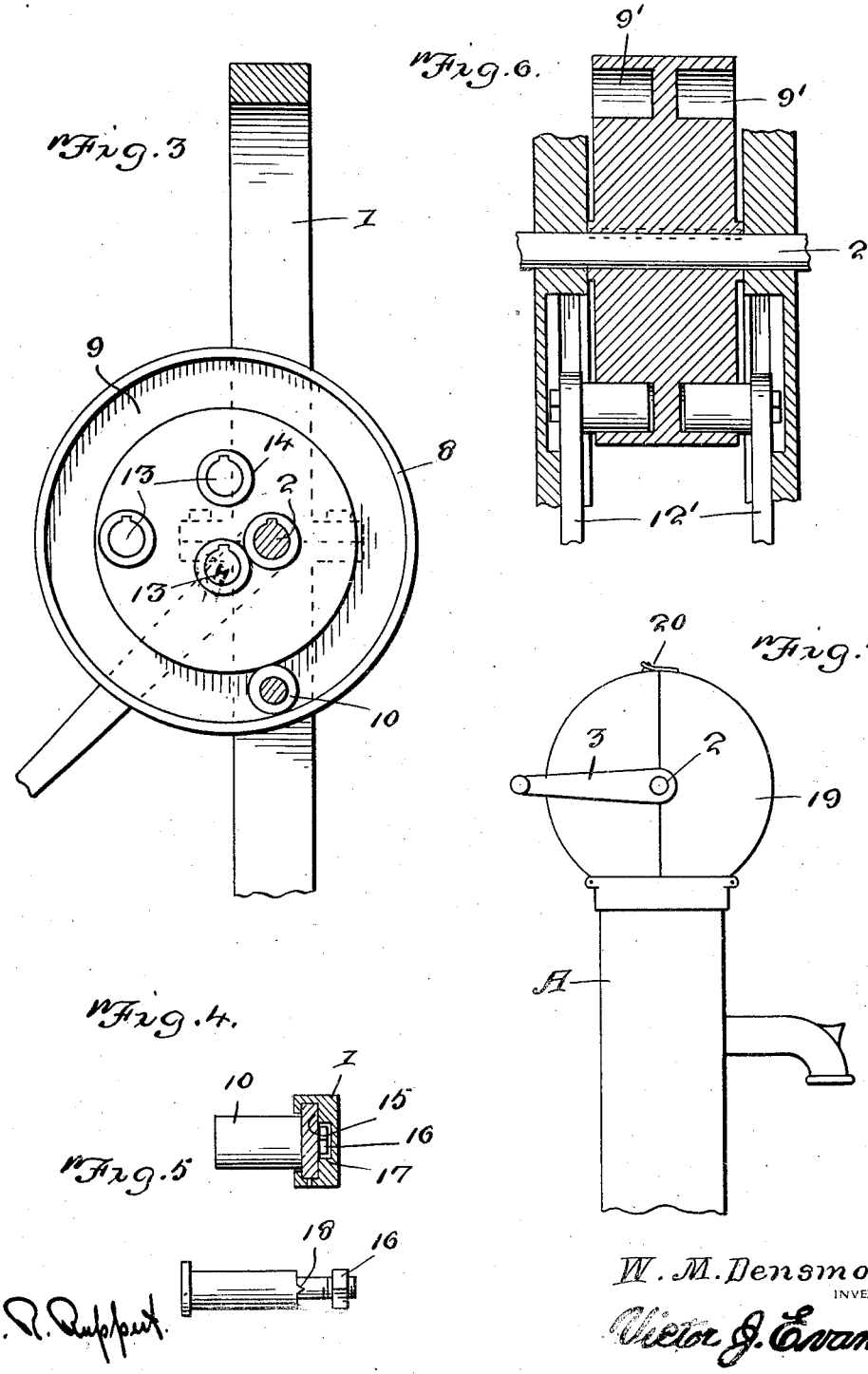

Patented Mar. 8, 1927.

1,620,445

UNITED STATES PATENT OFFICE.

WILLIAM MONROE DENSMORE, OF MONTEVIDEO, MINNESOTA, ASSIGNOR OF ONE-HALF TO WILLIAM MONTHE, OF MONTEVIDEO, MINNESOTA.

CAM DEVICE.

Application filed May 19, 1926. Serial No. 110,290.

This invention relates to a transmission device, the general object of the invention being to provide novel means for the transmission of a rotary movement to a reciprocatory movement, with means for permitting adjustments of the stroke of the reciprocatory member.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a section on line 3—3 of Figure 1.

Figure 4 is a section on line 4—4 of Figure 2.

Figure 5 is a view of the bolt for connecting the roller to the plunger rod.

Figure 6 is a sectional detail view showing a double arrangement.

Figure 7 is a view of a pump showing the parts of the invention enclosed in a housing.

Figure 1:
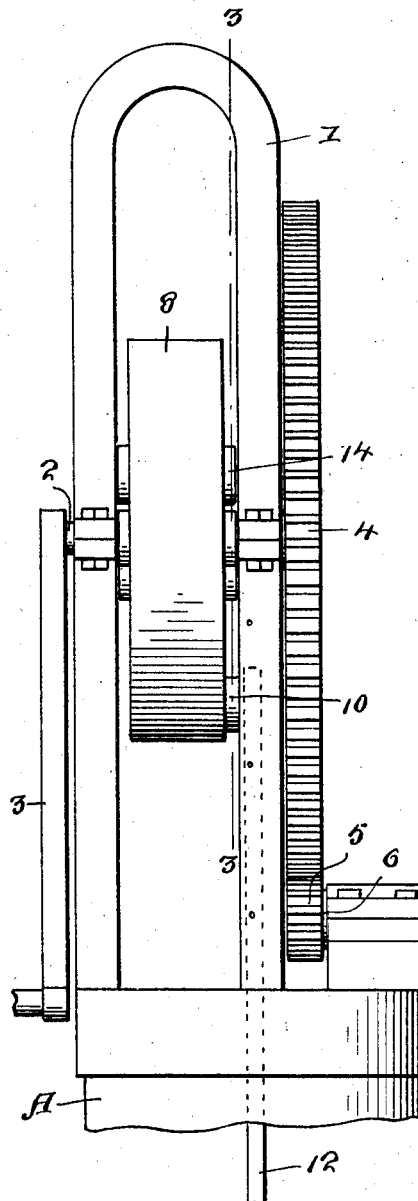
Figure 1 is a side view showing the invention applied to a pump.
Figure 2:
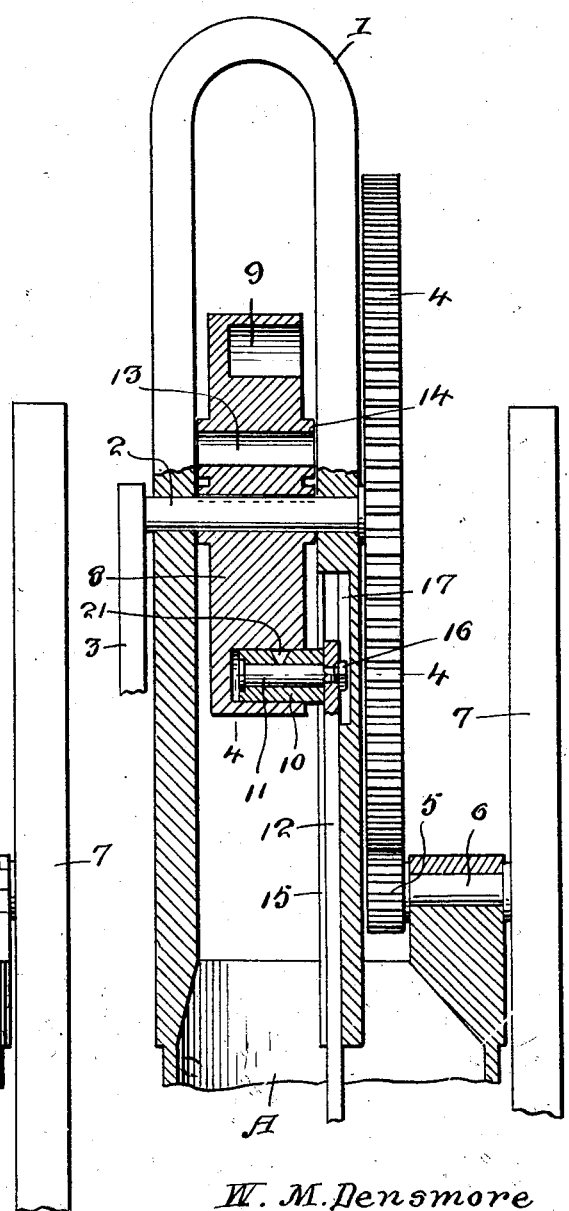
Figure 2 is a similar view but showing the parts in section.

As will be seen, the drawings show the device applied to a pump but it will, of course, be understood that it can be used in connection with mowing machines and other machinery where a rotary movement is converted into a reciprocatory movement.

In these views, 1 indicates a yoke-shaped frame which is mounted on the top of a pump A or other support, and said frame rotatably supports a shaft 2 which is shown as having a crank handle 3 attached to one end thereof and a gear 4 attached to the other end so that the shaft can be rotated either by hand or by power. It will, of course, be understood that the shaft can be rotated in any desired manner. The drawings show the gear 4 meshing with a pinion 5 carried by a stub shaft 6 to which a belt pulley 7 is connected so that the shaft can be driven from any suitable source of power.

A disk 8 is eccentrically mounted on the shaft 2 and has a concentric groove 9 therein for receiving a roller 10 carried by a bolt 11 which is fastened to the plunger rod 12 of the pump. The disk is provided with a plurality of holes 13 for receiving the shaft 2 so as to permit the stroke of the plunger rod to be adjusted by placing the shaft 2 in the proper hole 13 in the disk. Each end of each hole is surrounded by a collar 14 formed on the disk.

Thus as the disk is rotated, the eccentric motion thereof will be imparted to the plunger rod 12 through means of the roller 10 on bolt 11 operating in the groove 9 so that the rod 12 will be reciprocated and due to the momentum of the heavy disk, the device will pass over dead centers without difficulty.

The rod 12 operates in a guideway 15 formed in one limb of the frame 1 and the nut 16 on the bolt 11 operates in a groove 17 formed in said limb and communicating with the guideway 15. The bolt is provided with a reduced part which passes through the rod 12 and the shoulder formed by this reduced part has a pointed projection 18 thereon which engages the rod 12 and thus prevents turning movement of the bolt.

Figure 7 shows the movable parts enclosed in a housing 19 formed in halves, the halves being hingedly connected with the pump and the halves are held together by the latch 20.

Figure 6 shows the device operating a pair of plunger rods 12', the disk being provided with a groove 9', one on each side thereof for receiving the rollers on the rods. In other respects, this form of device is the same as that before described.

From the foregoing, it will be seen that I have provided a simple arrangement of converting a rotary movement to a reciprocatory movement, such means eliminating dead centers so that the efficiency of the device is increased.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Transmission means comprising a shaft, means for rotating the same, a disk eccentrically mounted on the shaft and having a ring-shaped groove therein, a reciprocatory member, a projection thereon engaging the groove, said disk having a plurality of holes therein for receiving the shaft so that the stroke of the reciprocatory member can be adjusted.

2. Transmission means comprising a support, a shaft rotatably mounted therein, means for rotating the shaft, a disk having a plurality of eccentrically arranged holes therein, any one of which is designed to receive the shaft and said disk having a ring-shaped groove therein, a reciprocatory member, a projection thereon, a roller carried by the projection engaging the groove and guiding means for the reciprocating member.

In testimony whereof I affix my signature.

WILLIAM MONROE DENSMORE.